Sept. 16, 1941. W. V. STAHL 2,256,414
SEED GERMINATOR AND PLANT COVER
Filed June 27, 1940
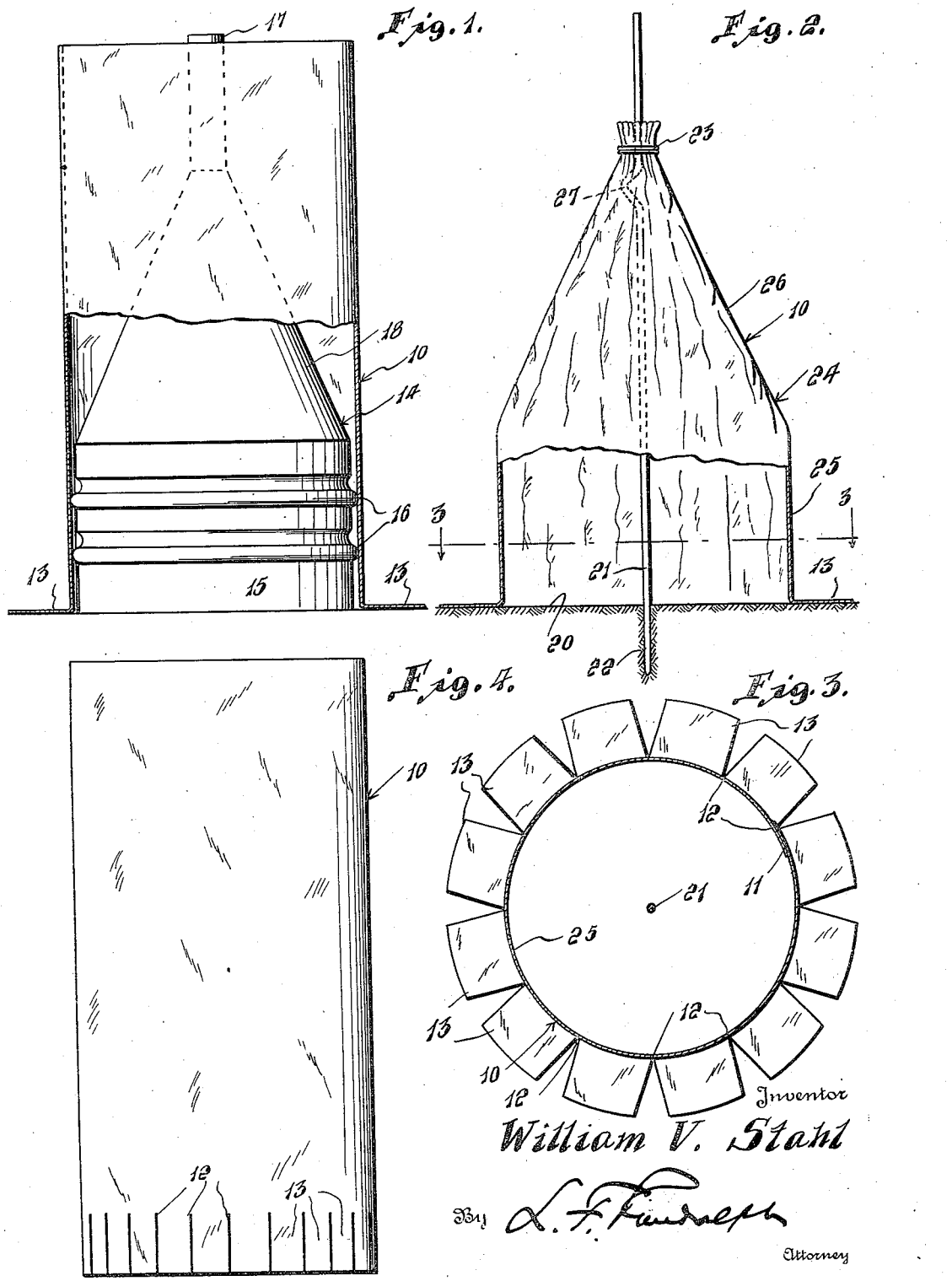

Patented Sept. 16, 1941

2,256,414

UNITED STATES PATENT OFFICE 2,256,414

SEED GERMINATOR AND PLANT COVER

William V. Stahl, Glendale, Calif.

Application June 27, 1940, Serial No. 342,803

3 Claims. (Cl. 47—28)

This invention relates to a novel plant cover and seed germinator which is preferably formed from a transparent or translucent material, such as paper which is in the form of a cylinder and which is adapted to be gathered at one end thereof to form the conical upper end of the cover.

Still another aim of the invention is to provide a stake for supporting the cover on the ground over a plant or over seed to be germinated, which stake is secured adjacent one end thereof to the upper, closed end of the cover, with the opposite end of the stake driven into the ground for supporting the cover.

Still a further aim of the invention is to provide a form of rigid construction for shaping the flexible sleeve member to provide novel means whereby tongues, formed at one end of the sleeve member, will be forced outwardly when the sleeve member, with the form therein, is placed in position on the ground.

Still another aim of the invention is to provide a plant cover provided with tie or other removable means for closing the restricted upper end thereof by means of which said end may be opened for thinning, cultivating and ventilating the plants contained therein.

Other objects and advantages of the invention will hereinafter become more fully apparent from the following description of the drawing, which illustrates a preferred embodiment thereof, and wherein:

Figure 1 is a side elevational view partly in vertical section showing the form disposed within the sleeve member from which the cover is formed, Figure 2 is a view similar to Figure 1, showing the seed germinator or plant cover fully assembled and connected to its supporting stake, Figure 3 is a horizontal sectional view taken substantially along the plane of the line 3—3 of Figure 2, and Figure 4 is a plan view of the blank from which the cover is formed.

Referring more particularly to the drawing, wherein like reference characters designate like or corresponding parts throughout the different views, 10 designates generally a tubular or cylindrical blank formed of a light and flexible material, such as paper or glassine which is preferably transparent or translucent and which is capable of resisting moisture. The cylindrical blank 10 may be formed from a single sheet of paper, the longitudinal edges of which are connected at 11 in any suitable manner, as by means of an adhesive or by stitching or stapling. The cylinder 10, at one end thereof, is provided with a plurality of spaced longitudinal slits 12, forming the tongues 13, for a purpose which will hereinafter be described.

A form, designated generally 14, of hollow, rigid construction, includes an enlarged cylindrical end 15 having spaced annular ribs 16. The opposite end of the form 14, designated 17, is likewise cylindrical but much smaller in diameter than the end 15. The ends 15 and 17 are connected by a conical intermediate portion 18. The form 14 is open from end to end and is adapted to be positioned in the cylindrical member 10 with the enlarged end 15 thereof, disposed with its free edge in alinement with the inner, secured ends of the tongues 13. The form 14, when thus positioned in the cylindrical member 10, as seen in Figure 1, will extend substantially therethrough and the ribs 16 of the end portion 15 will engage tightly against the cylindrical member 10 to prevent a substantial amount of air from passing upwardly between the end 15 and the member 10 when the parts are placed in position on the ground over a plant. The upper portion of the cylindrical member 10 is gathered around the conical portion 18 and the end 17 of the form 14, after which the end 17 is closed, as placing a finger thereover. The cylindrical member 10, with the form 14 disposed therein, is then placed over a plant, for example, and as the end 15 approaches the ground, indicated by the line 20, a back pressure of air will be created in the form 14 to cause the tongues 13 to be blown outwardly so that they will come to rest flat on the ground, as seen in Figures 1 and 2. The end 17 is then exposed to release the air in the form 14 and the upper portion of the cylindrical member 10 which is gathered around the form, is released to permit the form to be withdrawn from the member 10 through its open, upper end. A stake 21 is then passed axially through the cylindrical member 10 and the lower end thereof is driven into the earth, as seen at 22 in Figure 2. The upper portion of the cylindrical member 10 is then gathered in the folds previously formed when said member was gathered on the form 14, and secured at its upper end by means of a cord tie or a rubber band 23 to the stake 21, adjacent the upper end thereof. The cylindrical member 10, thus secured to the stake 21, as illustrated in Figure 2, forms a cover 24 which is provided with a cylindrical base portion 25, and a conical upper portion 26, which is closed at its upper end by the tie 23. The stake 21 is provided with an offset portion or abutment 27 which is disposed beneath the tie 23 to prevent the cover 24 from collapsing and sliding downwardly relatively to the stake 21. The tongues 13 are adapted to be covered with earth, not shown, for anchoring the cover 24 to the ground 20, and if desired, before cover 24 is closed at its upper end the earth, not shown, may be placed against the inner side of the base portion 25 to further assist in anchoring the cover 24.

It will be obvious that the cover will protect the plants disposed therein from insects, birds, bacteria, frost and the elements, and will also form a hot house for the plants, thereby aiding in germinating the seed and in the growth of the plant, so that the plant will mature in a shorter period. The tie 23 can be removed to open the upper end of the cover 24 for cultivating or thinning the plant, not shown, disposed therein and for permitting air to circulate through the cover. When the cover is not in use it may be collapsed and folded for convenient storage.

Various modifications and changes are contemplated and may obviously be restored to as only a preferred embodiment of the invention has been disclosed.

I claim as my invention:

1. A setting form for use with a plant protector cover composed of a tubular member of a relatively light, flexible material having a plurality of spaced, longitudinal slits adjacent one end thereof forming a plurality of tongues in said end, comprising a hollow form of rigid construction having a cylindrical base portion, at one end thereof, sized to snugly fit within a portion of said tubular member with the tongues of the tubular member projecting from the free end of said cylindrical base portion, a tapered conical shaped intermediate portion, and a restricted cylindrical opposite end, one end of said tubular member being adapted to be gathered around the cone shaped portion of said form and the upper end of said form being adapted to be closed when the form, with the tubular member positioned thereon, is placed over a plant, to create a back pressure of air in the enlarged end of the form, as said end approaches the ground, for forcing the tongues outwardly.

2. A setting form for use with a plant cover composed of a sleeve member of flexible, transparent material having tongues projecting from one end thereof, comprising a form of rigid material, removably mounted in said sleeve member for applying said member to the ground and for projecting said tongues outwardly to form supporting flanges for engaging the ground, said form having a restricted upper portion about which the upper portion of said sleeve is adapted to be gathered, said form being removable from the sleeve and said gathered end of the sleeve being adapted to be closed to form a hood.

3. In a plant protector and setting form, a tubular cover member of light, flexible material, a form for receiving and shaping said tube member to provide a tapered hood portion at the upper end thereof, and a supporting member disposed within said tube member and connected to its upper, closed end for mounting the cover member over a plant.

WILLIAM V. STAHL.